United States Patent [19]
Creger

[11] Patent Number: 5,910,176
[45] Date of Patent: Jun. 8, 1999

[54] APPARATUS AND METHOD FOR CALIBRATING A COMPUTER BASED MODEL OF AN ATTRIBUTE OF A MOBILE MACHINE

[75] Inventor: Todd D. Creger, Metamora, Ill.

[73] Assignee: Caterpillar Inc., Peoria, Ill.

[21] Appl. No.: 08/739,470

[22] Filed: Oct. 28, 1996

[51] Int. Cl.$^6$ .......................... G06F 17/00; G06F 19/00
[52] U.S. Cl. ................................ 701/59; 701/29; 701/68
[58] Field of Search .................................. 701/59, 68, 29, 701/100, 104, 112, 114, 101; 73/118.2, 118.1; 477/110, 30, 111

[56] References Cited

U.S. PATENT DOCUMENTS

| | | | |
|---|---|---|---|
| 5,377,112 | 12/1994 | Brown, Jr. et al. | 701/115 |
| 5,509,520 | 4/1996 | Evans et al. | 192/3.23 |
| 5,526,266 | 6/1996 | Rutan et al. | 701/100 |

*Primary Examiner*—William A. Cuchlinski, Jr.
*Assistant Examiner*—Gertrude Arthur
*Attorney, Agent, or Firm*—James R. Yee

[57] ABSTRACT

Apparatus and method for estimating an attribute associated with a mobile machine. The machine has an engine and a powertrain. The powertrain includes a torque converter coupled to the engine. The apparatus and method sense a plurality of parameters of the machine and responsively produce a plurality of respective parameter signals and calculating an estimated value of the attribute as a function of the parameter signals using a computer based model. The apparatus and method further calculates first and second estimated values of a torque converter input torque, compares the first and second torque converter input torque estimate signals and responsively calibrates the computer based model.

7 Claims, 3 Drawing Sheets

Fig_1_

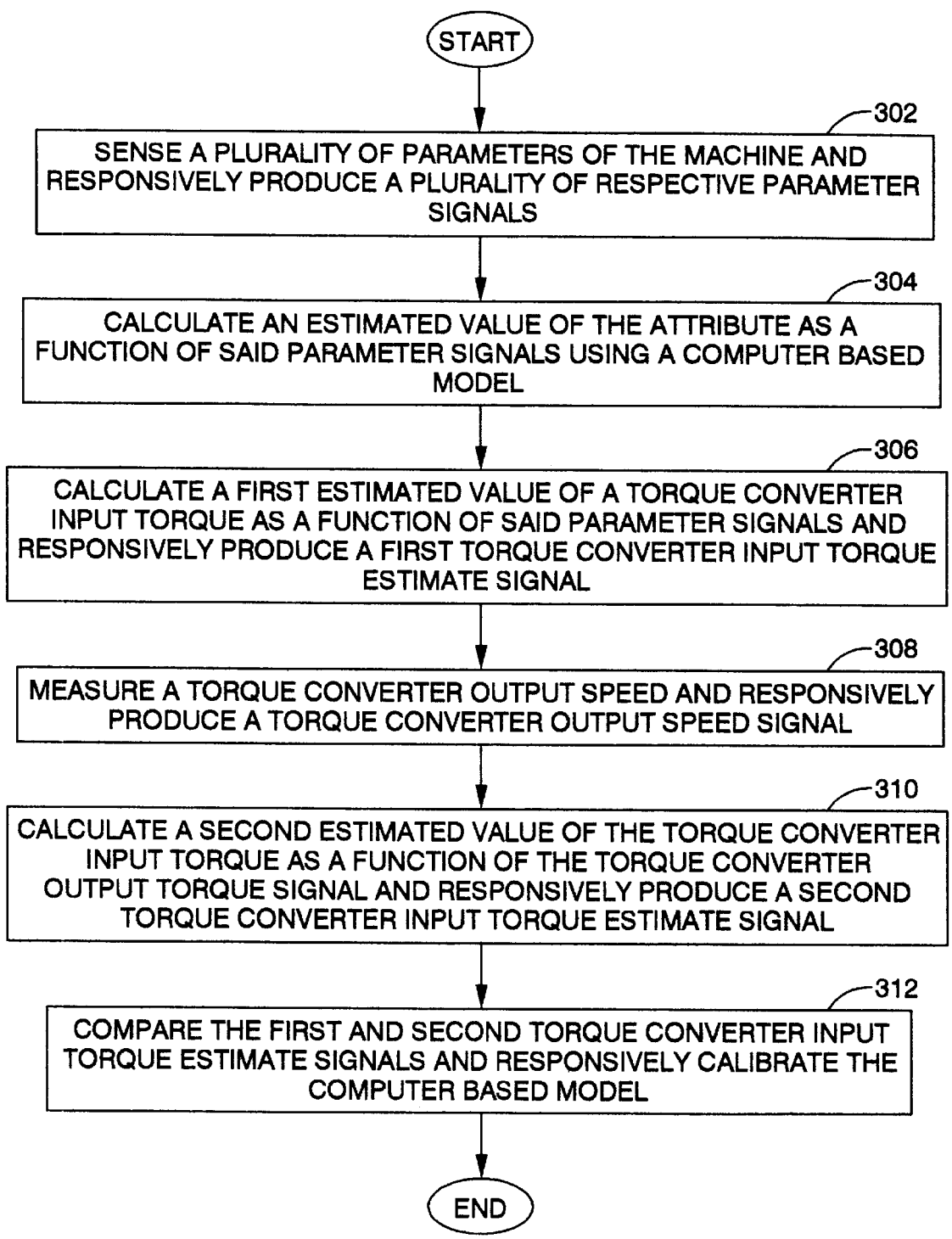
Fig_3_

APPARATUS AND METHOD FOR CALIBRATING A COMPUTER BASED MODEL OF AN ATTRIBUTE OF A MOBILE MACHINE

TECHNICAL FIELD

This invention relates generally to a method for determining an estimate of an attribute of a mobile machine using a computer based model, and more particularly, to a method for calibrating the computer based model.

BACKGROUND ART

Proper maintenance of a mobile machine's powertrain system is an important priority in the daily operation of a vehicle. Without proper maintenance minor problems can escalate into major mechanical failures, resulting in costly downtime and expensive repairs.

One way to predict future problems is to measure and track various parameters of the engine and driveline. For example, engine oil temperature may be measured and monitored. If engine oil temperature exceeds a predetermined value then the occurrence can be logged and/or the operator can be notified to address the problem.

Another useful value to monitor is driveline torque. However, sensors which measure torque are costly and may be unreliable especially in extreme operating conditions.

One solution is to use computer based models. Computer based models may either replace particular sensors or used to compare the outputs of a computer based model with a sensed value. This comparison may show an unusual or undesirable operating condition. One such system is described in U.S. Pat. No. 5,377,112 issued to William L. Brown on Dec. 27, 1994.

One of the problems associated with such computer based models is accuracy. First, the models only provide estimated values. The accuracy of the resultant estimated value is dependent on how good the model is. Second, accuracy will be dependent upon actual real time operating conditions.

The subject invention is directed at overcoming one or more of the problems as set forth above.

DISCLOSURE OF THE INVENTION

In one aspect of the present invention, a method for estimating an attribute associated with a mobile machine is provided. The machine has an engine and a powertrain. The powertrain includes a torque converter coupled to the engine. The method includes the steps of sensing a plurality of parameters of the machine and responsively producing a plurality of respective parameter signals and calculating an estimated value of the attribute as a function of the parameter signals using a computer based model. The method further includes the steps of calculating first and second estimated values of a torque converter input torque and comparing the first and second torque converter input torque estimate signals and responsively calibrating the computer based model.

In another aspect of the present invention, an apparatus for estimating an attribute associated with a mobile machine is provided. The machine includes an engine and a powertrain. The powertrain includes a torque converter coupled to the engine. The apparatus includes a plurality of mobile machine parameter sensors and a diagnostic controller. The controller calculates an estimated value of the attribute using a computer based model as a function of parameter signals received from said plurality of mobile machine parameter sensors, calculates first and second estimated values of a torque converter input torque as a function of said parameter signals, compares said first and second estimated values and responsively calibrates said computer based model.

BRIEF DESCRIPTION OF THE DRAWINGS

FIG. 3 is a flow diagram illustrating operation of the present invention.

BEST MODE FOR CARRYING OUT THE INVENTION

Figure 1:
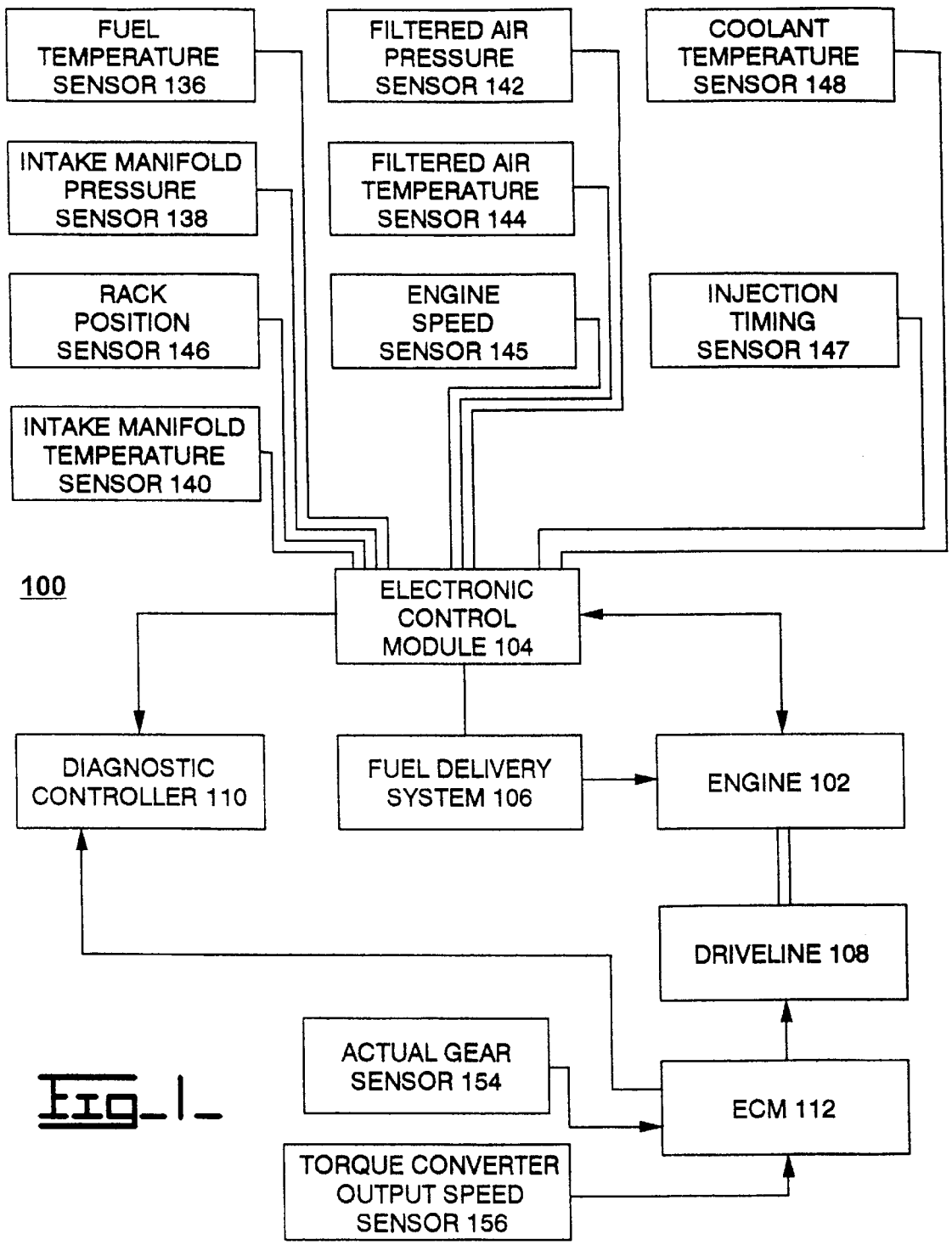
FIG. 1 is a block diagram of an apparatus for performing the present invention.

With reference to FIG. 1, the present invention is adapted to determine an estimated value of an attribute of a mobile machine 100 using a computer based model. The present invention provides a method for calibrating the computer based model.

In general, the computer based model receives information from a plurality of sensors coupled to the mobile machine 100 and responsively calculates an estimate of the attribute. The mobile machine may be any type of mobile machine 100 having an engine 102 and a driveline 108. Preferably, the mobile machine 100 is an earthmoving machine such as a track-type tractor, wheel loader, or the like.

For example, the attribute may be exhaust temperature, turbocharger boost pressure or a driveline torque. It should be noted that the present invention may be adapted to calibrate computer based models for other attributes of the machine 100. Thus, the present invention is not limited to applications of a computer based model for estimating any single attribute. Computer-based models for estimating exhaust temperature and turbocharger boost pressure are disclosed in U.S. Pat. No. 5,377,112 issued to William L. Brown on Dec. 27, 1994, which is herein incorporated by reference.

For the purposes of discussion only, the following explanation of the present invention will involve a computer based model for estimated a driveline torque attribute. However, the present invention is expressly not limited to such an application.

The engine 102 is typically controlled by an electronic control module 104. The ECM 104 communicates with a fuel delivery system 106. Typically, the fuel delivery system 106 includes a mechanical fuel injection system or an electronic governor. The fuel delivery system 106 controls the amount of fuel delivered to the engine 102. The engine 102 drives a driveline 108.

A second ECM 112 controls transmission clutches in the driveline 108.

A diagnostic controller 110 receives powertrain information from both the ECM 104 and the second ECM 112 based on sensors connected to the engine 102 and driveline 108. The diagnostic controller 110 uses the engine information to calculate a driveline torque value as discussed below.

In the preferred embodiment, the diagnostic controller 110 receives information via the engine ECM 104 from a fuel temperature sensor 136, an intake manifold pressure (boost pressure) sensor 138, an intake manifold temperature sensor 140, a filtered air pressure sensor 142, and a filtered air temperature sensor 144. The diagnostic controller 110 also receives information from an engine speed sensor 145, a rack position sensor 146, an injection timing sensor 147, and a coolant temperature sensor 148.

The diagnostic controller 110 also receives information from an actual gear sensor 154 and a torque converter output speed sensor 156 as communicated by the driveline ECM 108.

Furthermore, the ECM 104 may also transmit other sensor information and other calculated engine parameters to the diagnostic controller 110. For example, the ECM 104 calculates the mass flow rate of fuel into the engine 102 as a function of engine speed (measured) and rack position or RACK. Note that the term RACK is used for historic purposes only. In engines controlled by an ECM, there is physically no rack. However, the term rack position (RACK) has been retained to refer to the amount of fuel delivered to the engine 102. The ECM 104 relays this information to the diagnostic controller 110. In the preferred embodiment, the ECM 104 also calculates an engine acceleration signal based on the engine speed signal and relays this information to the diagnostic controller 110.

In one embodiment, the diagnostic controller 110 includes a microprocessor capable of receiving the ECM information and performing the necessary diagnostic routines on board the vehicle.

In a second embodiment, the diagnostic controller 110 records or stores the ECM (sensed and calculated) information in a memory for download into an external computer for future analysis.

In a third embodiment, the diagnostic controller 110 includes a transmitter (not shown) for transmitting the data to a remote site for processing. A satellite system receives the signals from the transmitter and relays the signals to the remote site. One suitable transmitter is the Omnitracs Mobile Messaging Communications Terminal.

The diagnostic controller 110 receives the parameter information from engine and driveline and determines a modeled value of a driveline torque.

Figure 2:
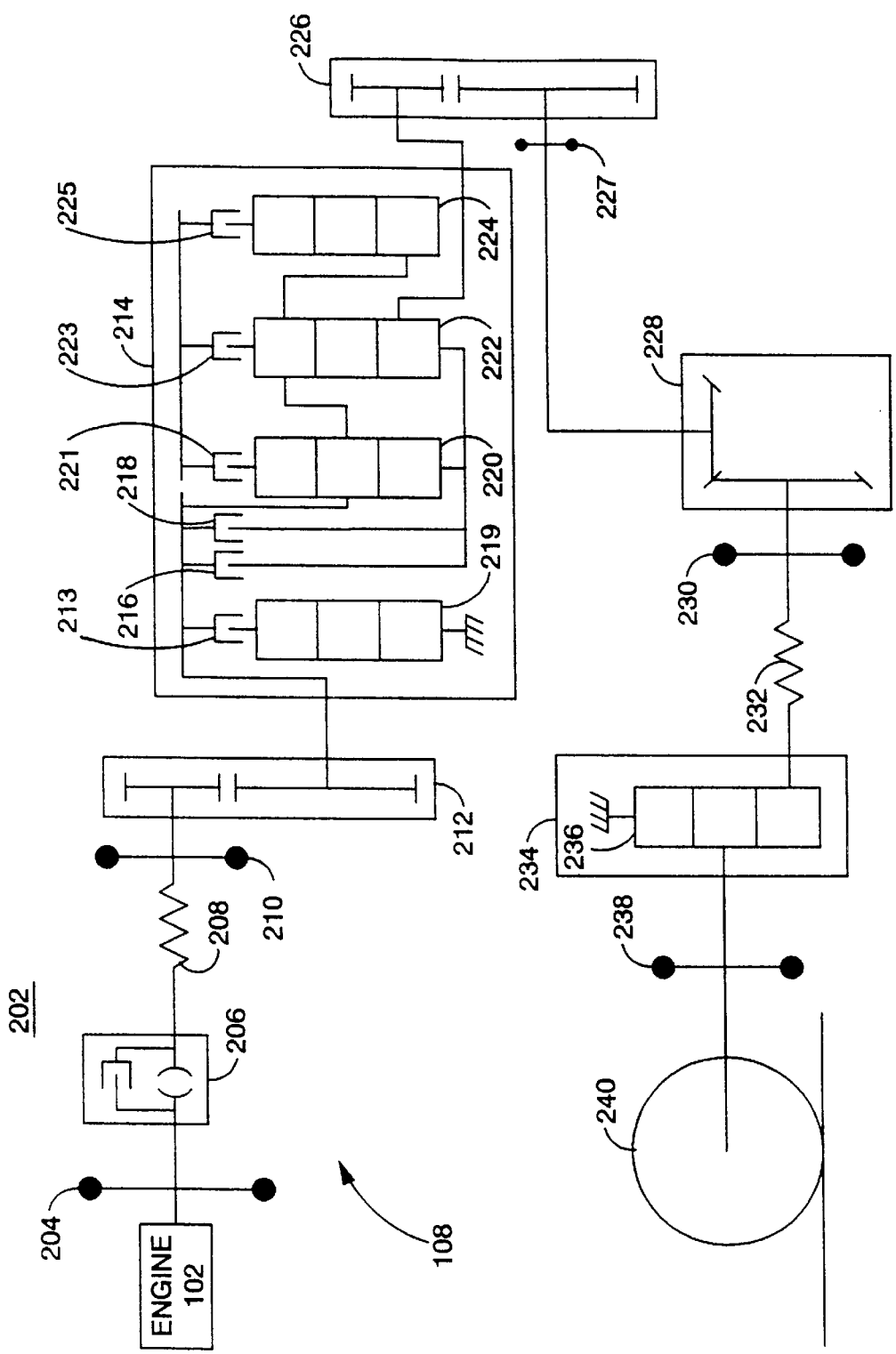
FIG. 2 is a diagrammatic illustration of a vehicle powertrain system.

With reference to FIG. 2, a mobile machine such as an earthmoving machine includes a powertrain 202 consisting of the engine 102 and driveline 108.

The engine 102 drives the driveline 108. A first inertia bar 204 represents the lumped rotating inertia at the output of the engine 102. This typically represents the flywheel inertia.

A torque converter 206 provides coupling between the engine 102 and a transmission 214. Preferably, the torque converter 206 includes a lock-up clutch.

Element 208 represents a torsional shaft stiffness between the torque converter and transmission. A second inertia bar 210 represents a second lumped driveline inertia. An input transfer gear 212 connects the torque converter 206 to the transmission 214.

In the preferred embodiment, the transmission 214 includes first, second, third, fourth, fifth, and sixth clutches 213, 216, 218, 221, 223, 225 and first, second, third, and fourth planetary gear sets 219, 220, 222, 224 to provide a plurality of forward and reverse gear ratios. Devices of this type are well known in the art and therefore are not further discussed.

An output transfer gear 226 couples the transmission 214 to a bevel gear differential 228. The bevel gear differential 228 delivers power to first and second wheels 240 (only one of which is shown) via a first and second final drives 234. While only the portion of the driveline between the bevel gear differential 228 and the first wheel 240 is illustrated and described below, the other portion of the driveline between the bevel gear differential 228 and the second wheel is identical.

A third inertia bar 227 represents the lumped driveline inertia between the transmission output and the bevel gear differential input. An element 232 represents the stiffness of the axle.

A fourth inertia bar 230 represents lumped rotating inertia between the bevel gear differential output and the first final drive 236.

The first final drive 234 includes a fifth planetary gear set 236.

A fifth inertia bar 238 represents the lumped rotating inertia between the first final drive 234 and wheel 240.

With reference to FIG. 3, the operation of the present invention will now be discussed. In a first control block 302, a plurality of parameters of the machine 100 are sensed and a plurality of respective parameter signals are produced. For the driveline torque model, the following engine information is used:

| | |
|---|---|
| engine speed | (SPEED), |
| timing advance | (TIMING), |
| rack position/fuel rate | (RACK), |
| intake manifold pressure | ($P_{INTAKE}$), |
| inlet air temperature | ($T_A$), |
| intake manifold temperature | ($T_{INTAKE}$), |
| inlet air pressure | ($P_{INLET}$), |
| coolant temperature | ($T_C$), and |
| fuel temperature | ($T_{FUEL}$). |

In a second control block 304, an estimated value of the attribute as a function of the parameter signals using a computer based model is calculated. In the preferred embodiment, the parameter signals are received (by the diagnostic controller 110), a modeled value of an output torque of the engine 102 is determined using a computer based model and a torque signal is responsively produced.

The torque model first determines a modeled value of the brake power. This is done by the following steps.

The volumetric efficiency of the engine 102 is calculated. The volumetric efficiency (VOL_EFF) is the mass flow efficiency of the engine 102 as it acts as a positive displacement pump. In the preferred embodiment, the volumetric efficiency of the engine 102 is obtained from an engine performance map. The engine performance map is empirically based and the volumetric efficiency is determined as a function of the rack position and the engine speed from the electronic control module 104.

The fuel to air ratio of the engine 102 is then calculated. In the preferred embodiment, calculating the fuel to air ratio (F/A) is determined by first determining the density of the air at the intake manifold and the mass flow of air to the engine 102. The density of the air is determined by:

$$D_{AIR}=P_{INTAKE}/(R_{AIR} \cdot T_{INTAKE}) \qquad \text{Equation 1}$$

where $R_{AIR}$ is the gas constant for air. Note that for $P_{INTAKE}$, the measured value or a modeled value may be used. A computer based model of boost pressure is disclosed in BROWN.

Using the density of air calculated in Equation 1, the mass flow of air through the engine 102 is determined by:

$$\overline{M}_{AIR}=\text{VOL\_EFF} \cdot D_{AIR} \cdot \text{VOL\_FL\_RT} \qquad \text{Equation 2}$$

where VOL_FL_RT is the volumetric pumping of the engine and is determined by:
where DISPLACEMENT is the total displacement of the engine 102 and SPEED is the engine speed.

The mass fuel flow is received from the ECM 104. Preferably, the mass fuel flow is adjusted based on the temperature of the fuel, $T_{FUEL}$. The fuel to air ratio is then determined by:

$$F/A = \tilde{M}_{FUEL}/\tilde{M}_{AIR} \qquad \text{Equation 4}$$

The indicated power is then calculated. The indicated power represents the chemical energy delivered to the pistons. To determine the indicated power, first the indicated specific fuel consumption is determined. The indicated specific fuel consumption represents how efficiently fuel is being converted to indicated power. In the preferred embodiment, the indicated specific fuel consumption has units of mass/(indicated power*time), for example, kg/(W*sec) and is determined using a map. The map is determined experimentally and the indicated specific fuel consumption (ISFC) is found as a function of TIMING, RACK, SPEED, and F/A. TIMING is a signal indicative of the position of the flywheel in relation to "top dead center", at which fuel is injected into the engine. Preferably, TIMING is measured in degrees of the flywheel. TIMING, RACK, and SPEED are received from the ECM 104.

Second, the pumping power (PP) is determined. PP represents the work done by the engine 102 to pump fluids (gas) from intake to the exhaust manifold and is determined by:

$$PP = (P_{intake} - P_{ex} - (P_{intake} \cdot \text{SPEED}^2 \cdot K1)) \cdot \frac{\text{SPEED} \cdot \text{DISPLACEMENT}}{2} \qquad \text{Equation 5 A}$$

where K1 is an experimentally derived constant and $P_{EX}$ is the pressure of the exhaust gas at the exhaust manifold. In one embodiment, $P_{EX}$, is measured by a sensor (not shown). In another embodiment, $P_{EX}$ is calculated as a function of the mass fuel flow, mass air flow, inlet temperature, $T_A$, and turbine outlet pressure.

Third, the heat loss during the compression/expansion cycle (HIP) is determined by:

$$HIP = K2 \cdot (P_{intake} \cdot K3 + K4) \cdot \\ (K5 \cdot (T_c + (T_{intake} - T_c) \cdot K6) - T_c) \cdot \\ \frac{\text{SPEED} \cdot \text{DISPLACEMENT}}{T_2 \cdot ((T_c + (T_{intake} - T_c) \cdot K6) - K7)} \qquad \text{Equation 5 B}$$

Then, the indicated power can be determined by:

$$IP = /ISFC + PP + HIP \qquad \text{Equation 5C}$$

where K2–K7 are experimentally derived constants.

The parasitic power loss due to engine friction (mechanical losses) and other losses can be determined using a map of power loss versus engine speed. The brake power or the power available at the flywheel of the engine 102 can be determined by subtracting the friction power from the indicated power.

$$BP = IP - FP \qquad \text{Equation 6}$$

After the brake power is determined, the net engine output torque is determined by the equation:

$$T_{ENG} = (BP/\text{SPEED}) K_{ENG} - \text{LOSSES} \qquad \text{Equation 7}$$

where $K_{ENG}$ is a predetermined constant and LOSSES includes parasitic losses and losses from any powertrain accessories, e.g., hydraulic systems, driven by the engine 102.

The torque at an arbitrary point M ($T_M$) on the driveline is determined as the difference between the torque converter output torque ($T_{TORQUE\_CONVERTER\_OUT}$) and the torque due to the reflected inertia accelerations seen by the driveline ($T_{DRIVELINE\_INERTIA\_N}$) with the difference being appropriately reflected to point M. Thus, TM is determined by the equation:

$$TM = (T_{TORQUE\_CONVERTER\_OUT} - T_{DRIVELINE\_INERTIA\_N})(\text{GRM-N})(\text{EFFMN}) \qquad \text{Equation 8}$$

where GRMN is the total gear reduction between the torque converter and point M and EFFMN is an efficiency term. In one embodiment, GRMN and EFBMN are predetermined constants based on the location of point M and the current gear (N) ratio of the transmission 214. In another embodiment, EFFMN is a calculated function of torque and speed.

If the torque converter lock-up clutch is locked, then no slippage across the torque converter occurs and the torque at the torque converter output ($T_{TORQUE\_CONVERTER\_OUT}$) is equal to the engine output torque (multiplied by an efficiency term).

$T_{DRIVELINE\_INERTIA\_N}$ is the torque due to accelerating inertia seen by the driveline and is determined by the equation:

$$T_{DRIVELINE\_INERTIA\_N} = I_{MN} \cdot \text{ACCELERATION} \qquad \text{Equation 9}$$

where IMN is a calculation based on predetermined lumped inertia constants and gear reductions. ACCELERATION is the rotational acceleration of the engine output shaft (as determined by taking the second derivative of SPEED).

In the preferred embodiment, $I_{MN}$ is determined by the equation:

$$I_{MN} = I_0 + \sum_{i=1}^{k} I_i[(x_i^2)!] \qquad \text{Equation 10}$$

where $I_0$ is the first lumped inertia value coincident with the engine output, $I_i$ are the lumped rotating inertias, and $X_I$ are the various gear reductions between the engine output and point M with k number of individual gearset reductions.

If the torque converter clutch is slipping, the torque converter output torque is no longer equivalent to engine torque and is calculated by the following equation:

$$T_{TORQUE\_CONVERTER\_OUT} = (\text{SPEED}_{TORQUE\_CONVERTER\_INPUT}/c)^2 \cdot (TP) \cdot (TR) \qquad \text{EQUATION 11}$$

where TP and TR are characteristics of the torque converter and are preferably determined via table look-up functions based on the torque converter speed ratio ($\text{SPEED}_{TORQUE\_CONVERTER\_OUT}/\text{SPEED}_{TORQUE\_CONVERTER\_IN}$).

$\text{SPEED}_{TORQUE\_CONVERTER\_IN}$ is equal to engine speed and $\text{SPEED}_{TORQUE\_CONVERTER\_OUT}$ is obtained from the torque converter output speed sensor 156. C is a predetermined constant.

When the torque converter is slipping, torque at a point downstream of the torque converter is calculated using Equation 9, where acceleration is determined by the second derivative of torque converter output speed.

Equations 8–11 form the basis for computing a torque value at any point on the driveline between the engine and driven wheels.

However, if point M is downstream of the bevel gear differential input, then division of the torque between the first and second wheels by the bevel gear differential must be taken into account. In one embodiment, a conventional open differential, for example, is used and it is assumed that the division is substantially equal. In other embodiment for example for a limited slip differential, the division is determined as a function of other driveline parameters.

In a third control block 306, a first estimated value of a torque converter input torque ($T_{TC\_INPUT\_TORQUE}$) as a function of the parameter signals is calculated and a first torque converter input torque estimate signal is produced.

In the preferred embodiment, the first estimated value of the torque converter input torque is determined by the equation:

$$T_{TC\_INPUT\_TORQUE} = BP/\text{SPEED} \cdot K8, \quad \text{Equation 12}$$

where K8 is a predetermined constant.

In a fourth control block 308, the torque converter input speed (or engine speed) is measured by the engine speed sensor 146 and responsively a torque converter input speed signal is produced.

In a fifth control block 310, a second estimated value of the torque converter input torque as a function of the torque converter output speed signal is calculated and a second torque converter input torque estimate signal is responsively produced.

In the preferred embodiment, the second estimated value is calculated by:

$$T_{TORQUE\_CONVERTER\_IN} = T_{TORQUE\_CONVERTER\_OUT}/TR. \quad \text{Equation 13.}$$

In sixth control block 312, the first and second torque converter input torque estimate signals are compared and the computer based model is responsively calibrated.

In the preferred embodiment, the computer based model is calibrated by adjusting the brake power calculated in Equation 6. In one embodiment, the brake power is adjusted using a predetermined step increment, i.e., $BP_{CALIBRATED} = BP + \text{STEP}$. In another embodiment, brake power is multiplied by a percentage based on the difference between the first and second estimated values, i.e., $BP_{CALIBRATED} = BP \cdot \text{SCALE FACTOR}$. In either embodiment, the calibrated brake power value is used to complete the model.

INDUSTRIAL APPLICABILITY

With reference to the drawings and in operation, the present invention provides a method for determining an estimate of an attribute of a machine using a computer based model. The estimated value may be used for diagnostic purposes, i.e., for comparison with an actual sensed value or in place of an actual sensed value.

The computer based model is calibrated by calculating two estimates of torque converter input torque. The two estimates are compared and the model updated in response thereto. In the preferred embodiment, the model calculates a brake power value as an interim step. The brake power value is adjusted based on the comparison between the two estimates.

Other aspects, objects, and advantages of this invention can be obtained from a study of the drawings, the disclosure, and the appended claims.

I claim:

1. A method for estimating an attribute associated with a mobile machine, the machine having an engine and a powertrain, the powertrain having a torque converter coupled to the engine, including:

sensing a plurality of parameters of said machine and responsively producing a plurality of respective parameter signals;

calculating an estimated value of said attribute as a function of said parameter signals using a computer based model;

calculating a first estimated value of a torque converter input torque as a function of said parameter signals, and responsively producing a first torque converter input torque estimate signal;

measuring a torque converter output speed and responsively producing a torque converter output speed signal;

calculating a second estimated value of said torque converter input torque as a function of said torque converter output speed signal and responsively producing a second torque converter input torque estimate signal;

comparing said first and second torque converter input torque estimate signals and responsively calibrating said computer based model.

2. A method, as set forth in claim 1, wherein the step of calculating an estimated value of said attribute as a function of said parameter signals using a computer based model includes the step of a calculating an estimate of a brake power associated with the engine.

3. A method as set forth in claim 2, wherein the step of calibrating said computer based model includes the step of adjusting said brake power estimate.

4. A method, as set forth in claim 1, wherein the attribute is oil temperature.

5. A method, as set forth in claim 1, wherein the attribute is a boost pressure.

6. A method, as set forth in claim 1, wherein the attribute is a driveline torque.

7. An apparatus for estimating an attribute associated with a mobile machine, the machine having an engine and a powertrain, the powertrain having a torque converter coupled to the engine, including:

a plurality of mobile machine parameter sensors;

a diagnostic controller for calculating an estimated value of the attribute using a computer based model as a function of parameter signals received from said plurality of mobile machine parameter sensors, said diagnostic controller programmed to calculate first and second estimated values of a torque converter input torque as a function of said parameter signals, comparing said first and second estimated values and responsively calibrating said computer based model.

* * * * *